United States Patent
Sahni et al.

(10) Patent No.: US 10,398,092 B2
(45) Date of Patent: Sep. 3, 2019

(54) MODULAR INDOOR FARM LIGHTING SYSTEM

(71) Applicants: Ranbir S Sahni, Long Beach, CA (US); Ian Cumming, Long Beach, CA (US); Larry Elliott, Long Beach, CA (US)

(72) Inventors: Ranbir S Sahni, Long Beach, CA (US); Ian Cumming, Long Beach, CA (US); Larry Elliott, Long Beach, CA (US)

(*) Notice: Subject to any disclaimer, the term of this patent is extended or adjusted under 35 U.S.C. 154(b) by 0 days.

(21) Appl. No.: 15/330,936

(22) Filed: Nov. 14, 2016

(65) Prior Publication Data

US 2017/0135290 A1    May 18, 2017

Related U.S. Application Data

(60) Provisional application No. 62/255,163, filed on Nov. 13, 2015.

(51) Int. Cl.
| | |
|---|---|
| *A01G 9/20* | (2006.01) |
| *A01G 9/26* | (2006.01) |
| *F21S 4/28* | (2016.01) |
| *F21V 7/04* | (2006.01) |
| *A01G 22/00* | (2018.01) |
| *F21V 19/00* | (2006.01) |
| *F21V 23/02* | (2006.01) |
| *F21Y 115/10* | (2016.01) |
| *F21Y 113/13* | (2016.01) |

(52) U.S. Cl.
CPC .......... *A01G 9/20* (2013.01); *A01G 9/26* (2013.01); *A01G 22/00* (2018.02); *F21S 4/28* (2016.01); *F21V 7/04* (2013.01); *F21V 19/0015* (2013.01); *F21V 23/02* (2013.01); *F21Y 2113/13* (2016.08); *F21Y 2115/10* (2016.08); *Y02A 40/274* (2018.01)

(58) Field of Classification Search
CPC . A01G 9/20; A01G 1/001; A01G 9/26; A01G 22/00; F21S 4/28; F21V 7/04; F21V 19/0015; F21V 23/02
See application file for complete search history.

(56) References Cited

U.S. PATENT DOCUMENTS

| | | | |
|---|---|---|---|
| 2014/0355272 A1* | 12/2014 | Chou | F21S 4/008 362/308 |
| 2016/0262313 A1* | 9/2016 | Szeto | A01G 7/045 |

* cited by examiner

*Primary Examiner* — Thomas M Sember
(74) *Attorney, Agent, or Firm* — Fulwider Patton LLP

(57) ABSTRACT

The present invention is a modular indoor farm lighting system. The lighting system is comprised of a frame comprising two or more retaining members and one or more support members. The retaining members are adapted to retain corrugated panels. The corrugated panels have light emitting diode (LED) bars disposed within their troughs. Each LED bar will be provided onto a combiner board. The combiner boards will provide each LED bar with power, and hold 4 LED bars in the preferred embodiment. The system may be hung by a carabiner and rope system to be attached to the vertical components of the support members.

10 Claims, 8 Drawing Sheets

MODULAR INDOOR FARM LIGHTING SYSTEM

CROSS-REFERENCE TO RELATED APPLICATION

The present application claims priority to U.S. Provisional Patent Application No. 62/255,163 filed on Nov. 11, 2015, entitled "FARMING GROWTH LIGHT FRAME" the entire disclosure of which is incorporated by reference herein.

BACKGROUND OF THE INVENTION

1. Field of Invention

The present invention relates to the field of indoor farming lights, and more specifically to a modular system of indoor farming lights which can provide for vertical stacking of crops. Light is the energy source that drives photosynthesis and other plant photomorphology. This invention uses energy efficient solid state lighting (LEDs) to maximize intensity in PPFD (Photosynthetic Photon Flux Density measured in Micromoles per second per sq.meter ($\mu$mol/s-m$^2$) while minimizing utility costs.

2. Description of Related Art

The indoor farming industry has been rapidly expanding since with the advent of power efficient lighting systems. Indoor farming allows growers to have greater control of the environment in which their crops grow. This controlled environment can prevent freezing over, unwanted pests, drying out, reduce water consumption by up to 90%, reduce fertilizer use, almost eliminate the use of pesticides, uses a third of the electricity, and eliminate or minimize other conditions which may negatively affect or even ruin crops. Furthermore, the grower has full control of the lighting in an indoor growing situation. This allows the grower to begin growing any type of crop, anytime of the year. In some cases, the grower can accelerate the growing cycle and harvest more times during the year than possible with outdoor growing.

Outdoor farming is most often limited to the square footage of the land. In contrast, indoor growing allows for crops to grow in a three-dimensional space. In some cases, an indoor farming operation can be a multi-level operation, wherein a building can have multiple crops on multiple levels. For example, a grower of an indoor growing operation may have one level dedicated to germination, one level dedicated to vegetation, and another level dedicated to blooming to create a farming operation that may continually be harvested. In another example, a grower of an indoor growing operation may have different levels each dedicated to the same or a different crop. This allows the grower to create different environments on different levels that best suit each individual crop.

As the popularity and interest in indoor farming has grown, so has the technology of indoor farming. Many indoor farms now utilize LED lights as they are highly efficient and can produce varying light wavelengths to optimize plant growth. However, many LED structures and drivers can be cumbersome. As a startup indoor farm may grow, the growers may have to purchase more lighting systems. Furthermore, they may wish to begin multi-tiered growing operations which requires light (not heavy) and efficient luminaires.

Based on the foregoing, there is a need in the art for a modular indoor farm lighting system where a grower can easily add more lights as their operation grows. What may be further desired is a modular indoor farming system which allows a grower to easily create a multi-tiered farming operation.

SUMMARY OF THE INVENTION

The present invention is an indoor farm lighting system. The system comprises of at least one corrugated panel having one or more light emitting diode bars disposed within the troughs of the corrugations. The corrugated panel is to be reflective, in a preferred embodiment it is comprised of aluminum.

The corrugated panel, containing LED bars, is to be fit into a frame. The frame consists of one or more retaining members. The retaining members have a cross-section, wherein a portion of the cross-section is adapted to receive the edges of the corrugated panels. The retaining members are attached to a support member which separates the retaining members. The support member has a general T-shape, wherein the vertical portion of the support member is provided with one or more through-holes to attach a mounting system. Together the retaining members and support members create the frame, allowing the corrugated panels to be received by the retaining members and hung.

In an embodiment, the LED bars are comprised of a main channel of LEDs and a secondary channel of LEDs. The channels are designed to be controlled separately by the addition of a potentiometer/rheostat or an external controller. In the embodiment, the LED bars will cover a wide range of wavelengths and color temperatures.

In an embodiment, a combiner board is provided to be within electrical communication with the LED bars. The combiner boards will provide each LED bar with power, and hold 4 LED bars in the preferred embodiment. In the preferred embodiment, the power supply is a constant 48-volt DC supply. In an embodiment, the combiner board will comprise of a common negative anode to allow a "poke-in" connection with the LED Bars. The arrangement allows for each channel of the LED bar to be controlled separately.

In a preferred embodiment, the system will be hung by a simple rope and hook attachment. Where a rope may be attached to a ceiling or another light fixture. On the other end of the rope, one or more hooks may be provided to attach to the through-holes provided on the vertical portions of the support members.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Preferred embodiments of the present invention and their advantages may be understood by referring to FIGS. 1-7, wherein like reference numerals refer to like elements.

Figure 1:
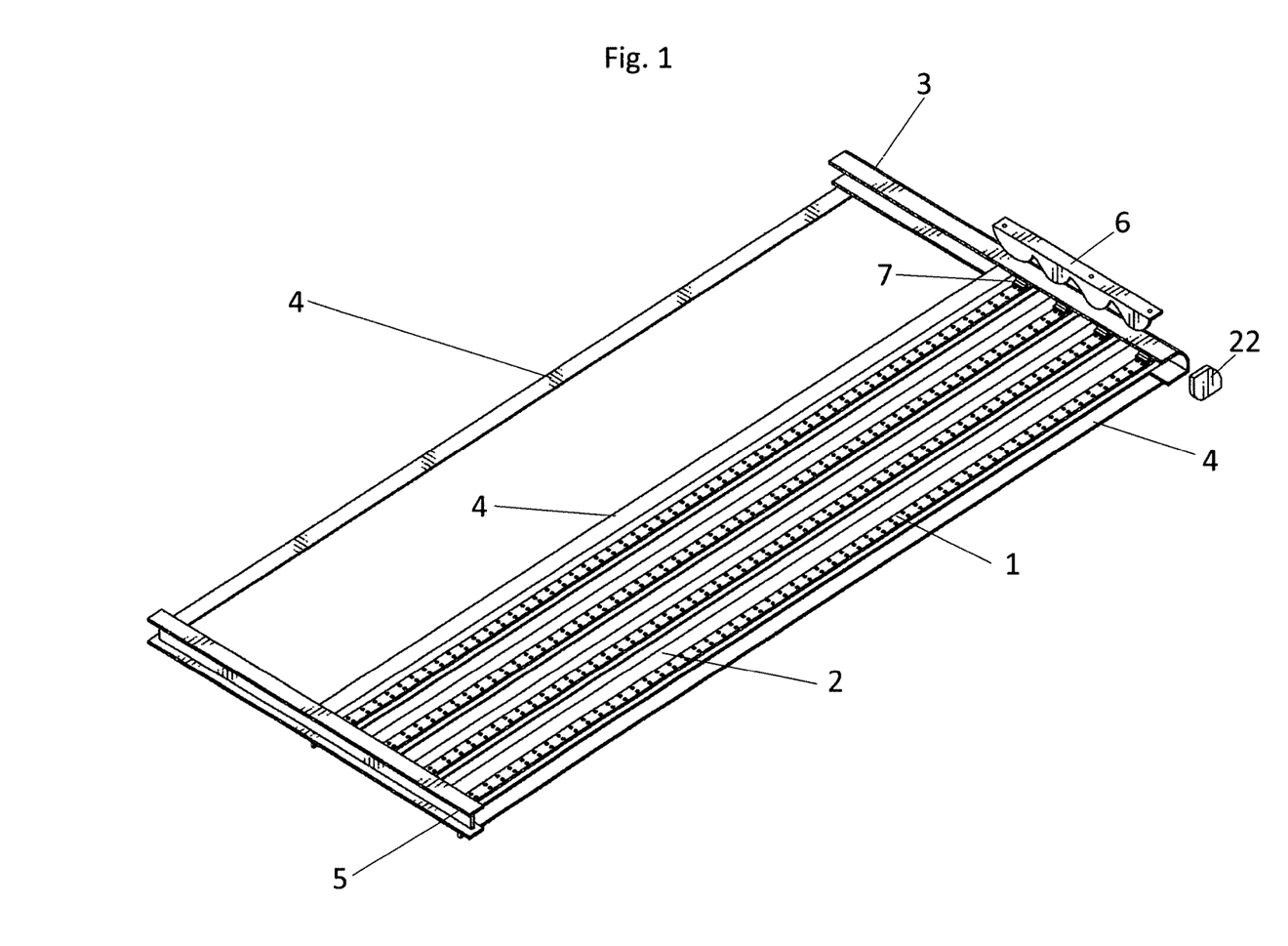
FIG. 1 is a perspective view of the modular indoor farm lighting system, according to an embodiment of the present invention.
Figure 2A:
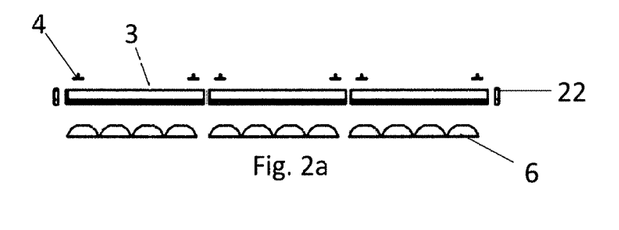
FIG. 2a is a top plan view of the modular indoor farm lighting system, according to an embodiment of the present invention.
Figure 2B:
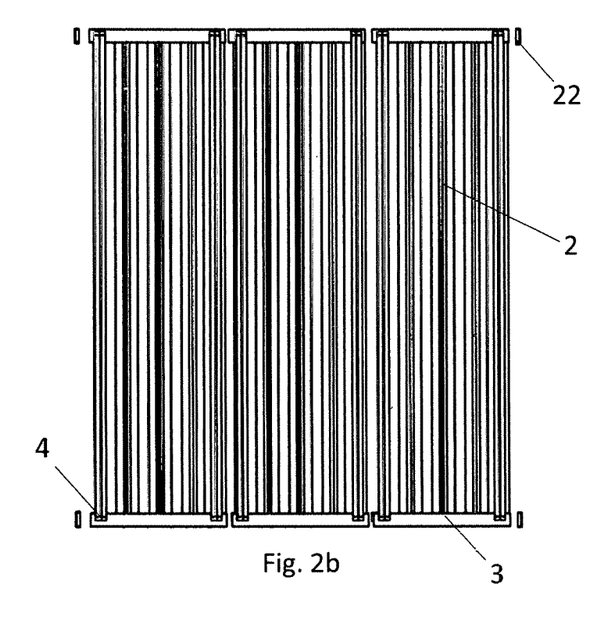
FIG. 2b is a front elevation view of the modular indoor farm lighting system, according to an embodiment of the present invention.

In reference to FIGS. 1-2, an embodiment of the vertical farming light is shown, wherein a frame comprising U-shaped retaining member 3, T-shaped support members 4, and I-shaped retaining member 5. All frame members are elongated and have two ends. In a preferred embodiment, the one of each T-shaped support member 4 are attached a U-shaped retaining member 3, and the other end of each T-shaped support member 4 is attached to the I-shaped retaining member 5. Attachment may be achieved by fastening with screws, bolts, welding, or other means deemed appropriate by one skilled in the art. In an embodiment, in which fastening devices are used to attach the members, holes are provided on the U-shaped retaining members 3, T-shaped support members 4, and I-shaped retaining members 5 adapted to engage with the fasteners. The U-shaped members retaining 3 and I-shaped retaining members 5 form open ends adapted to receive a corrugated aluminum panel 2. For added support, more T-shaped support members 4 may be added to the configuration of the frame.

In an embodiment, any I-shaped retaining member 5 may be replaced by U-shaped retaining members 3. In another embodiment, any U-shaped retaining member 3 may be replaced by a retaining I-shaped member 5. In another embodiment, the retaining members may have any cross-sectional shape which comprises of at least one general U-shape. The U-shape portion of the cross-section should be adapted to retain one edge of the corrugated panels 2.

In a preferred embodiment, corrugated aluminum panels 2 may be slid into the frame configured by the support members 4 and U-shaped retaining members 3 to secure it in place, as the retaining members 3 are open at each end. End caps 22 are provided to close the open ends of the retaining members 3 after the panels 2 have been inserted. Each panel 2 is preferably made of 6063 T5 Aluminum, with a thickness around 0.81 millimeters, and is provided in approximately 4 foot by 1 foot segments, but may be any material or dimensions deemed appropriate. The frame and panels are configured to be easily adapted to grow areas of various dimensions. Therefore, in a preferred embodiment, the support members and the panels are four feet in length. The retaining members may be provided or adjusted to the length necessary to accommodate the panels 2. In an embodiment, the retaining members may be supplied in pre-determined lengths and attached together to allow the user to create a desired length.

In a preferred embodiment, the panels 2 are provided with one or more light emitting diode (LED) bars 1 within the troughs of the corrugations. Each LED bar 1 is attached to a combiner board 7 to supply power to each LED Bar 1. In an embodiment, each combiner board 7 may receive a separate power signal from the main controller. The preferred embodiment will contain 4 such LED bars 1. In the embodiment, the highly polished corrugated aluminum reflector serves as the heat sink, reduces weight, and determines the beam width of radiated light. In an embodiment, the panels of the corrugated aluminum adjacent to the LED bars 1 are positioned at a 45-degree angle relative to the LED bar 1 to create optimal light distribution, but any angle deemed appropriate may be selected. In the embodiment, the corrugated aluminum panel 2 will function as both a light reflector and heat dissipation mechanism. By using the panels to serve as both light reflectors and heat sinks, this design keeps the weight of the luminaire to a minimum. As such, the whole LED grow light fixture can be kept as thin as possible, taking into account Underwriters Laboratory (UL) safety considerations. In an embodiment, the fixture is less than 2" thick. By reducing the thickness, users are able to have multiple vertical layers, expanding the square footage dedicated to growing and increasing the efficiency of the grow area.

Figure 3:
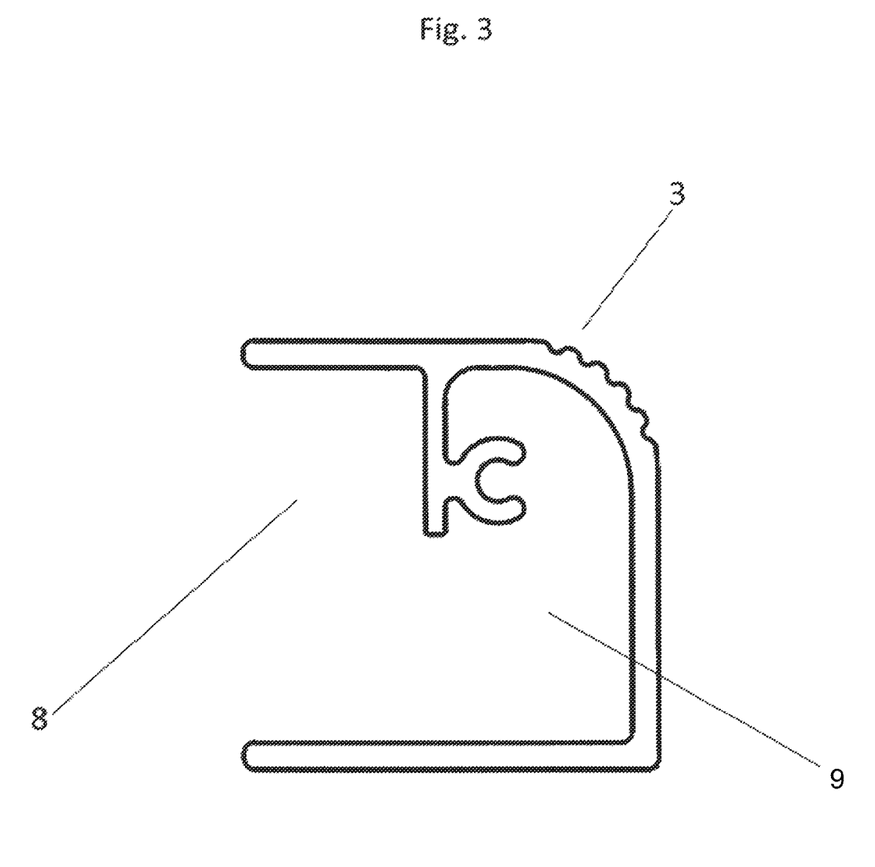
FIG. 3 is a plan view of a retainer member of modular indoor farm lighting system, according to an embodiment of the present invention.

In an embodiment, with reference to FIG. 3, a cross-section of the retainer member 3 is shown. The retainer member 3 should have a generally U-shaped void 8 to engaged with the ends of the corrugated panel to retain it. In a preferred embodiment, the retaining member 3 is further provided with an inner void 9 to retain a combiner board.

Figure 4:
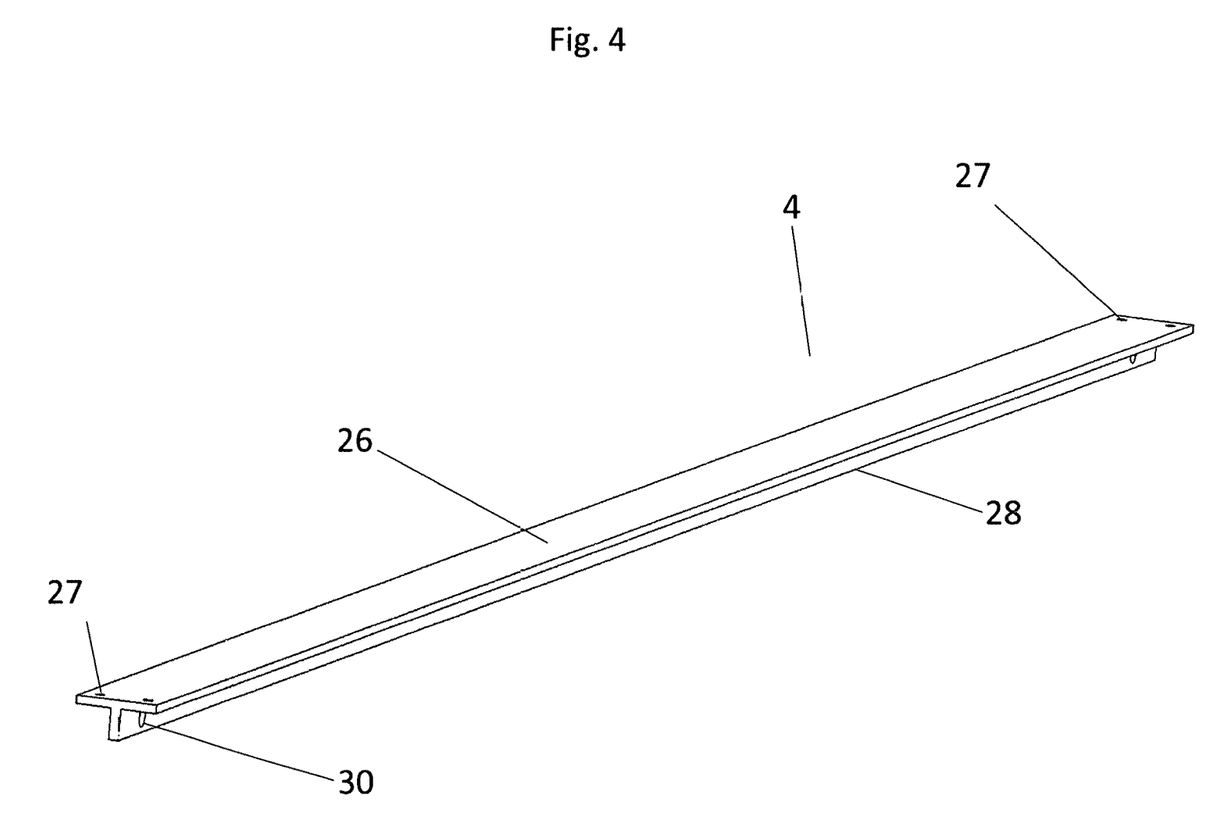
FIG. 4 is a perspective view of a T-shaped support member of the modular indoor farm lighting system, according to an embodiment of the present invention.

In an embodiment, with reference to FIG. 4, the support member 4 is shown, having a generally T-shaped cross section, with a horizontal member 26 provided with holes 27 to engage with fastening devices to be secured to the retaining members. When the present apparatus is installed, the support members are positioned such that is the horizontal portion 26 of each T-shaped member is below the vertical portion 28 of the T-shaped member. The vertical portion 28 can include holes 30 positioned to allow attachment of the frame to an upper shelf via carabiners, or hung via special cables and grippers, or other means of attachment. The supplied overhead hanging system allows for tilting the fixture and raising or lowering it to adjust PPFD levels at the canopy. Because LEDs are used as the energy source, little forward heat is generated so the luminaire can be mounted very close to the plant canopy without causing any heat stress or transpiration to the plant and its leaves.

Figure 5:
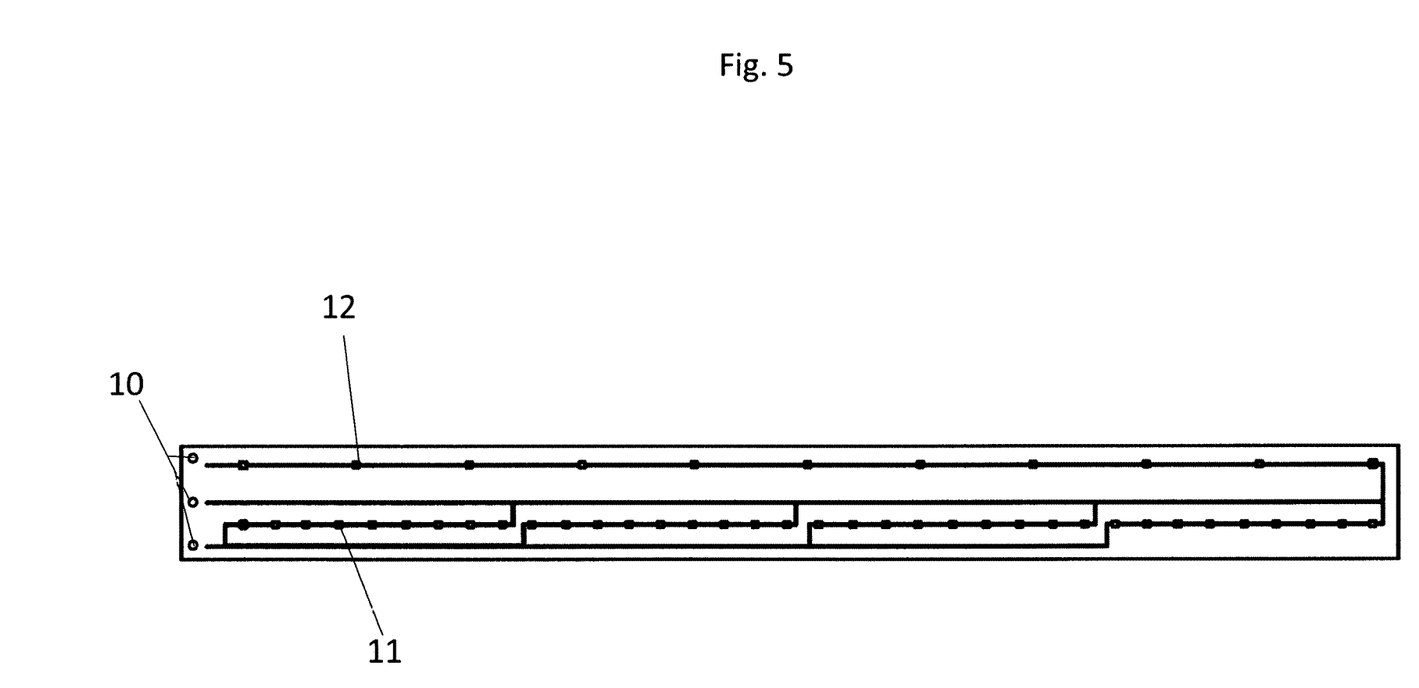
FIG. 5 is a detailed view of the LED bar of the modular indoor farm lighting system, according to an embodiment of the present invention.
Figures 6, 6B:
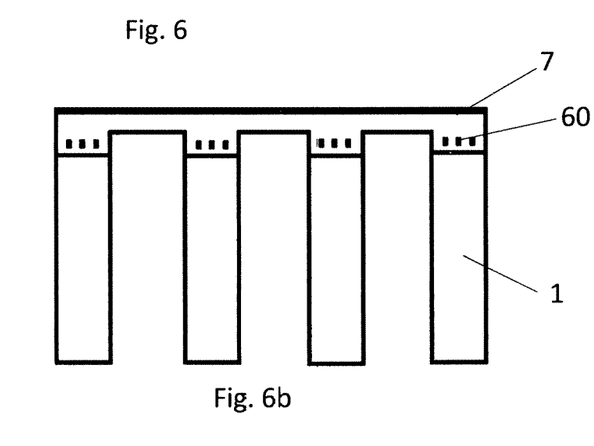
FIG. 6b is a top plan view of LED bars on a combiner board of the modular indoor farm lighting system, according to an embodiment of the present invention.
Figure 6A:
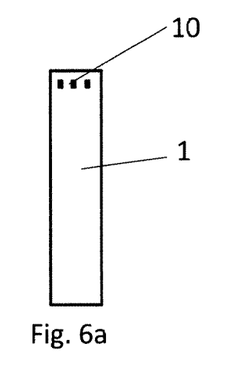
FIG. 6a is a top plan view of an LED bar of the modular indoor farm lighting system, according to an embodiment of the present invention.
Figure 6C:
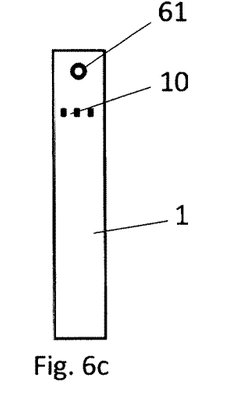
FIG. 6c is a top plan view of an LED bar of the modular indoor farm lighting system, according to an embodiment of the present invention.
Figure 6D:
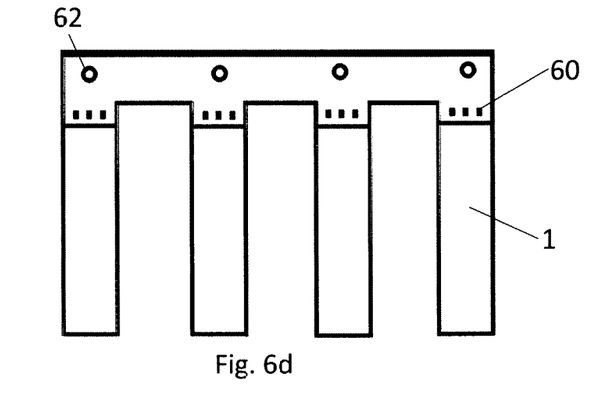
FIG. 6d is a top plan view of LED bars on a combiner board of the modular indoor farm lighting system, according to an embodiment of the present invention.

In reference to FIG. 5-6, a preferred embodiment of an LED bar 1 is shown, wherein the LED Bar comprises of a main channel 11, and a secondary channel 12. In a preferred embodiment, a total of 36 LEDs are provided in main channel 11, arranged in four groups of nine LEDs, each group of nine wired in series within the group, and each group wired in parallel with the other groups. The apparatus permits any number, arrangement, wiring, or configuration of LEDs may be used to achieve desired light recipes for various species and growth stages. Furthermore, the primary channel may consist of a mixture of blue (450 nm) LEDs and red (660 nm) LEDs to provide appropriate chlorophyll A and chlorophyll B that plants, micro greens, and vegetables require for proper growth. Any monochromatic LED with wavelengths from 200 nm to 850 nm and white LED with color temperatures from 2,000 degrees Kelvin to 10,000 degrees Kelvin may be used. Each luminaire is supplied with a specified spectrum. In an embodiment, the correct mixture of LEDs can be pre-selected depending on what the user intends to grow. The luminaire will be manufactured with 4 standard spectra for microgreens, leafy greens, greens and a standard full spectrum white light for special plants and medical herbs. Two additional white light "recipes" will be available for special order. Customized spectra can be easily accommodated. The apparatus permits any wavelengths from 250 nm to 850 nm and any color temperatures from 2,000 degrees Kelvin to 10,000 degrees Kelvin to be surface mounted on the printed circuit board (PCB).

In a preferred embodiment, the secondary channel 12 contains 18 LEDs wired in series and is designed to be adjusted and controlled to vary photosynthesis, period, nutritional content, anti-oxidants, nutrients, or stem length/leaf density (look of the plants). This will allow the grower to fully customize the exposure of their plants. For example, providing additional far red LEDs in the second channel can alter the color to make red lettuce leaves. Far red can also be used as a switch for the plant circadian system, making adaption to light and dark photosynthesis more effective. This second channel can also be configured with more blue LEDs or red LEDs if additional PPFD is required for optimum harvest yield which is species dependent. In another embodiment, the secondary channel 12 may be provided with additional LEDs or fewer LEDs as deemed appropriate. See above for wavelength and color temperature options.

In a preferred embodiment, the main channel 11 and secondary channel 12 are designed to be controlled separately by the addition of a potentiometer/rheostat or an external controller (not shown) that can adjust the intensity level and light pulsing frequency to provide conditions the plant requires. In an embodiment, each LED board contains contacts 10 are adapted to receive power for each light channel. The contacts 10 will be in electrical communication with the combiner board contacts 60. In another embodiment, the LED board is provided with a combiner attachment 61, wherein a screw or bolt may be used to fasten the combiner attachment with the LED attachment 62, provided on the combiner board.

Since the light intensity of each channel can be adjusted separately, users can vary the light spectrum (light recipe) to match the requirements of the plants throughout the different stages of growing, i.e. germination, vegetation, blooming, flowering and to accommodate optimum light recipes for different species. For example, if the primary channel contains more red LEDs than blue LEDs, whereas channel two contains more blue LEDs than red LEDs, one can lower the intensity of the primary channel, and increase the intensity of the secondary channel during the germination stage, or vice versa for blooming/flowering. Furthermore, the grower may adjust the light pulsing frequency to match the photon absorption rate of a particular plant species. The controller used may be a commercially available model or one specifically designed for the luminaire. In a preferred embodiment, a constant voltage 48 volt DC (VDC) power supply will provide power to the light allowing for dimming and/or control via current manipulation, if necessary. The power supply voltage may be changed as deemed necessary. Power to the LED boards is provided by a "combiner board" which uses a common negative line (anode) to simplify assembly and power distribution. The combiner board uses a simple "poke in" connector for ease of assembly.

The LED printed circuit boards each consist of two channels which can be controlled separately if desired. Control can be effected by way of simple dimmers (potentiometers/rheostats) or an external wired or wireless control system.

The design also helps keep the installation tooling to a minimum, This approach not only reduces tooling costs, but also increases production rates as there is little variation in components for different sized lighting.

Figure 7A:
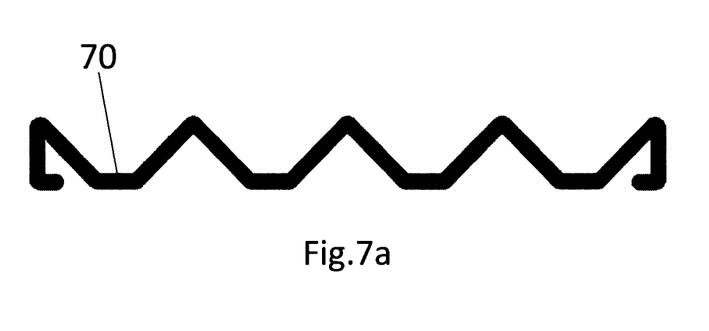
FIG. 7a is a cross-sectional view of the corrugated reflective panel of the modular indoor farm lighting system, according to an embodiment of the present invention.
Figure 7B:
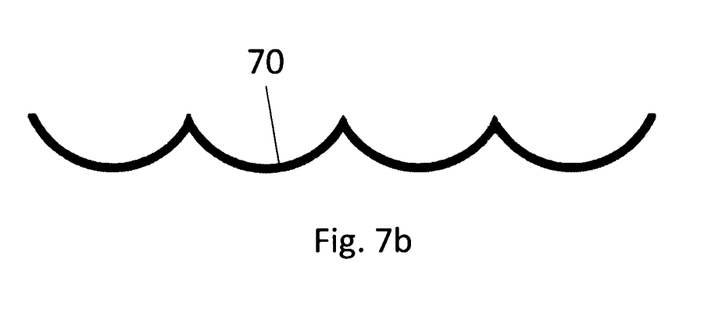
FIG. 7b is a cross-sectional view of the corrugated reflective panel of the modular indoor farm lighting system, according to an embodiment of the present invention.

In reference to FIG. 7, a cross-section of the corrugated reflective panel is shown. In reference to FIG. 7a, an embodiment of the corrugated reflective panel is shown with straight side panels adjacent to the troughs 70 which will provide the LED bars. In reference to FIG. 7b, an embodiment of the corrugated reflective panel is shown with curved side panels adjacent to the troughs 70 which will provide the LED bars.

Figure 8:
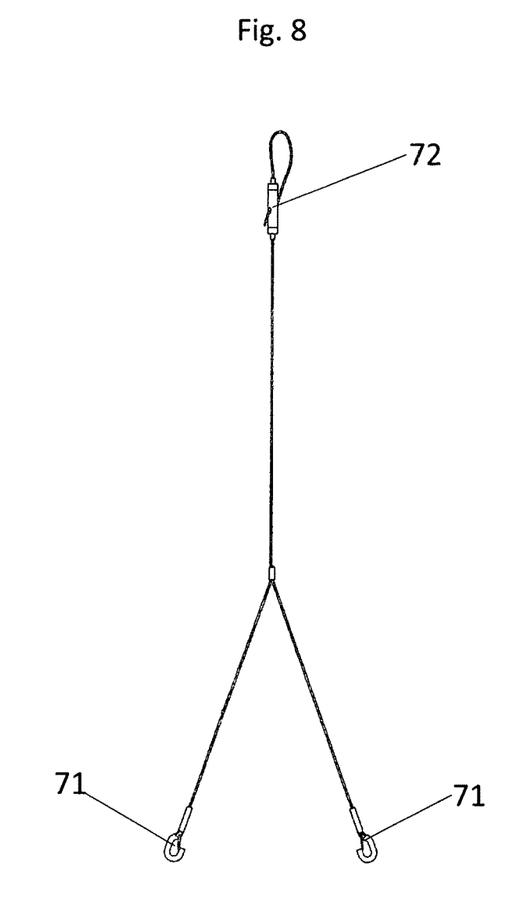
FIG. 8 is a perspective view of the hanging system of the modular indoor farm lighting system, according to an embodiment of the present invention.

In reference to FIG. 8, a supplied hanging apparatus is shown, wherein a rope lock 72 is provided to adjust the height of the fixture relative to the ground. Additionally, one or more hooks 71 are provided to engage with the apertures provided on the vertical components of the support members, to hang the modular indoor farm lighting system.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. An indoor farm light system comprising:
   a reflective corrugated panel;
   a circuit board being directly mounted to the reflective corrugated panel;
   a plurality of light emitting diodes (LEDs), on an LED bar, directly mounted to the circuit board;
   a combiner board connected to the circuit board, the combiner board physically attached to each LED bar;
   a means on the combiner board for receiving constant voltage or constant current DC power from a remote source; and
   a frame means for holding the reflective corrugated panel;
   wherein the frame means comprises two or more support members, generally T shaped, and two or more retaining members, wherein the two or more support members are oriented perpendicular to the two or more retaining members, and separate the two or more retaining members, said two or more retaining members being adapted to receive the reflective corrugated panel.

2. The indoor farm light system of claim 1, wherein the combiner board is configured to distribute power to at least one light emitting diode bar.

3. The indoor farm light system of claim 2, wherein the combiner board comprises of a common negative anode.

4. The indoor farm light system of claim 1, wherein the light emitting diode bars comprise of one or more channels.

5. The indoor farm light system of claim 4, wherein the one or more channels of the light emitting diode bars may be controlled separately.

6. The indoor farm light system of claim 1, wherein the retaining members comprise a cross-section containing at least one generally U-shaped portion.

7. The indoor farm light system of claim 6, wherein the U-shaped portion of the cross-section of the retaining member is adapted to retain at the reflective corrugated panel.

8. An indoor farm light system comprising:
   a reflective corrugated panel;
   a circuit board being directly mounted to the reflective corrugated panel;
   a plurality of light emitting diodes (LEDs), on an LED bar, directly mounted to the circuit board;
   a combiner board connected to the circuit board, the combiner board physically attached to each LED bar;
   a means on the combiner board for receiving constant voltage or constant current DC power from a remote source; and
   a frame means for holding the reflective corrugated panel.

9. The indoor farm light system of claim 1 wherein the reflective corrugated panel comprises aluminum.

10. The indoor farm light system of claim 9, wherein the reflective corrugated panel comprises 6063 T5 Aluminum.

\* \* \* \* \*